UNITED STATES PATENT OFFICE.

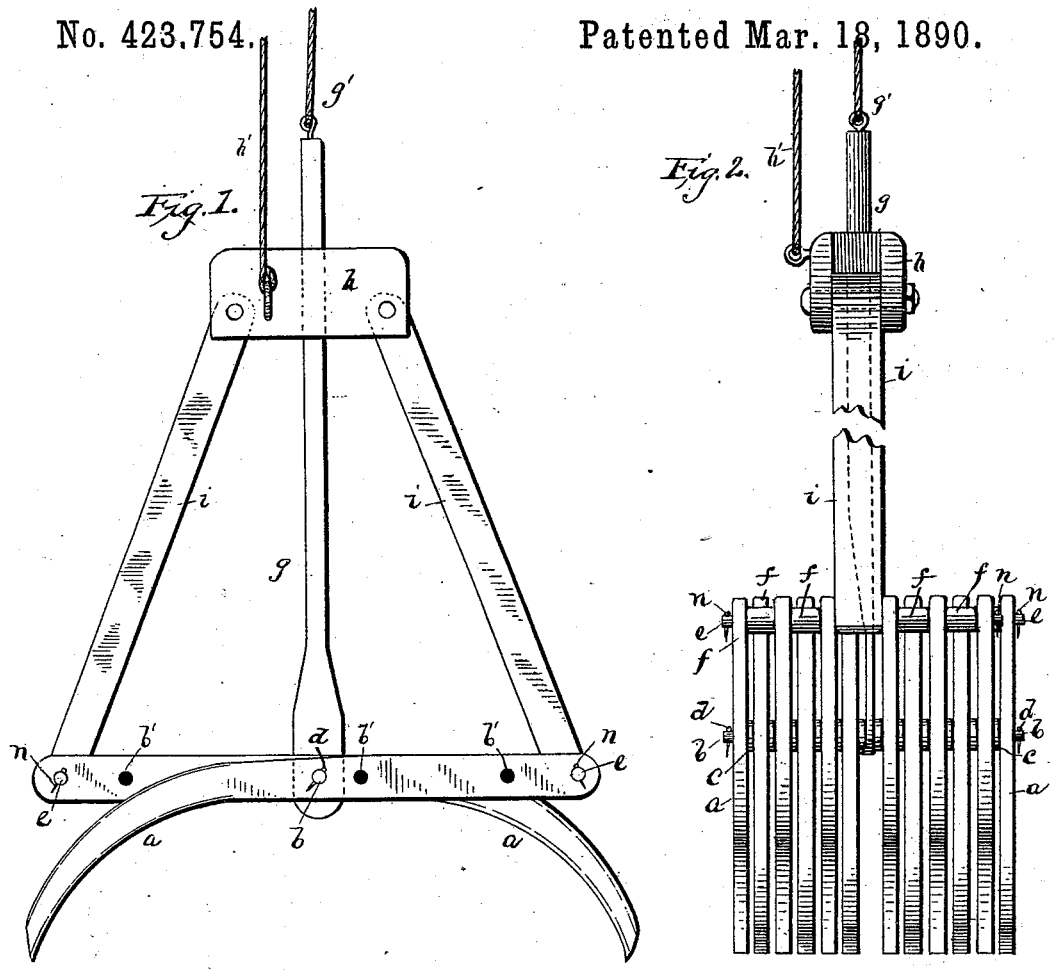
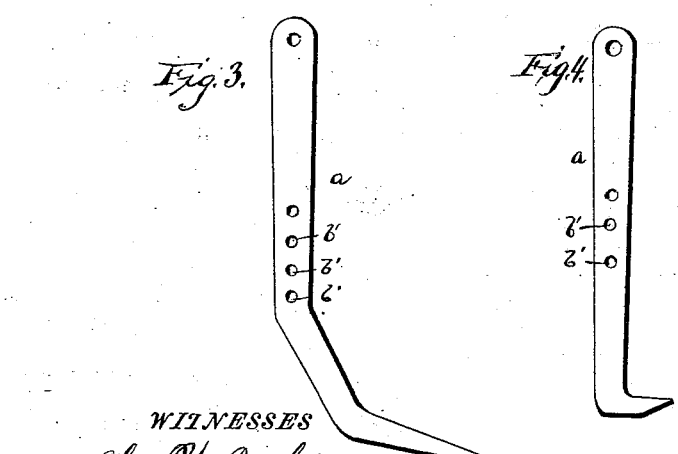

ALEXANDER H. GEER, OF BARTOW, FLORIDA.

GRAPPLE.

SPECIFICATION forming part of Letters Patent No. 423,754, dated March 18, 1890.

Application filed January 23, 1890. Serial No. 337,840. (No model.)

*To all whom it may concern:*

Be it known that I, ALEXANDER H. GEER, a citizen of the United States, residing at Bartow, in the county of Polk and State of Florida, have invented certain new and useful Improvements in Grapples, of which the following is a specification, reference being had therein to the accompanying drawings, in which—

Figure 1 represents an end elevation, and Fig. 2 a side elevation, of my improved grapple. Figs. 3 and 4 represent views of different forms of blades or tongs.

The invention has for its object to provide an improved grapple for raising sponges, oysters, sea-corals, or loose rock at the bottom of the sea or rivers, and also for use in raising wreckage, as will be more fully hereinafter described.

In the drawings, $a\ a$ designate two series of crossed tongs or blades pivoted together by a rod $b$ at their point of intersection, the bars of one series alternating with the bars of the other series, as shown. Spacing-washers $c$ are introduced between the blades to prevent them impinging against each other, and removable pins $d$ are inserted in the ends of the rod $b$ in order that the blades may be removed for any desired purpose. The blades are provided with supplemental holes $b'$ near their point of intersection, so that they may be adjusted to either shorten or lengthen their lower curved grappling portions. The upper ends of each series are connected together by a rod $e$, provided with removable pins $n$ in its ends and having loose spacing-blocks $f$, mounted upon it between the blades.

Pivotally connected to the pivotal bar $b$, about midway the length of the same, is a vertical bar $g$, passing through a sliding cross-head $h$, which is connected by pivotal bars $i$ to the bars $e$. The bar or rod $g$ passes loosely through a central aperture in the cross-head, and the bars $i$ are pivotally connected to the opposite ends of the latter. Cords or chains $g'\ h'$ are respectively connected to the upper end of the rod $g$ and cross-head $h$ for the purpose of lowering and raising the device.

The operation is as follows: The device is let down into the water by means of the chain or rope $g'$, the weight of the cross-head $h$ and bars $i$ causing the tongs to open, as shown in Fig. 1. When the device reaches the bottom of the sea or river, it is raised by means of the other cord $h'$. Pulling on this cord causes the tongs to close upon any object that may lie between them and securely grapple or clasp the same.

An advantage of this device is that if lowered by the proper cord it will always remain open, and if raised by the other cord the tongs will in every case close before leaving the bottom.

If the rod $g$ is long enough, it is evident that the cord $g'$ may not be needed.

Any form of blade may be used without departing from the invention—as, for instance, those forms shown in Figs. 3 and 4.

What I claim is—

The combination of the two series of crossed blades, the rods $e$, connecting their upper ends, the vertical rod $g$, connected to the center of their pivotal rod, the sliding cross-head, the pivotal bars $i$, connecting the said cross-head to the rods $e\ e$, and an operating cord or cords, substantially as described.

In testimony whereof I affix my signature in presence of two witnesses.

ALEXANDER H. GEER.

Witnesses:
W. L. BROWN,
R. NOLAN.